G. W. Blaksley,
Breast Collar.
No. 88,838.
Patented Apr. 13, 1869.
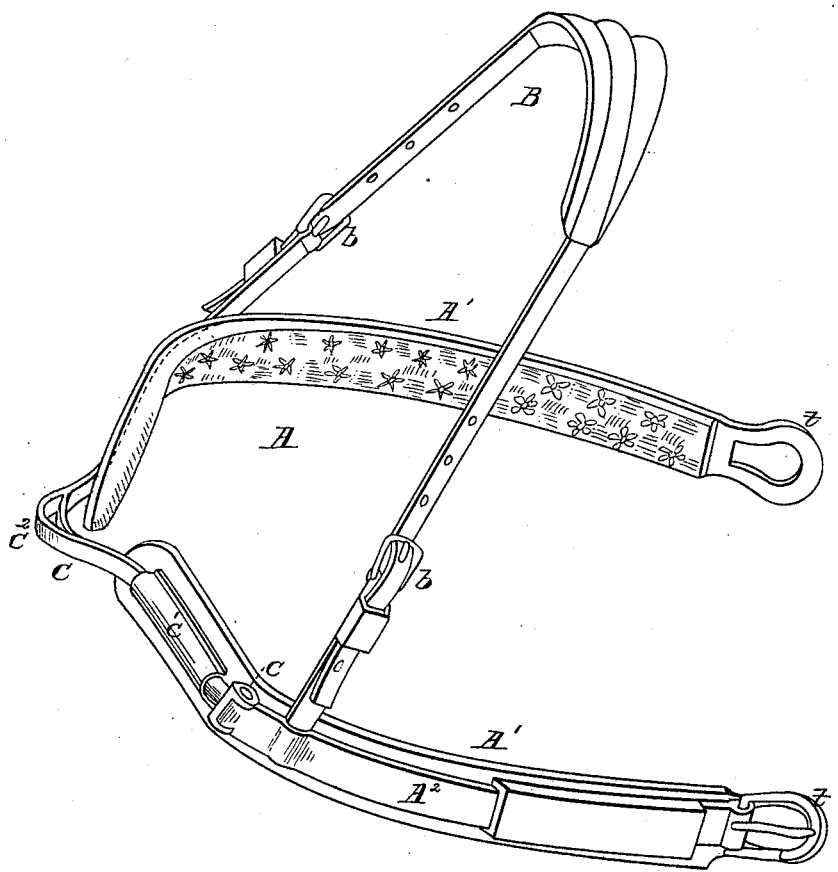
Witnesses.
C. A. Pettit
S. C. Kenron
Inventor.
G. W. Blaksley
Munn & Co
Attorneys.

GEORGE W. BLAKSLEY, OF ROCKFORD, ILLINOIS.

Letters Patent No. 88,838, dated April 13, 1869.

IMPROVED BREAST-COLLAR.

The Schedule referred to in these Letters Patent and making part of the same

*To all whom it may concern:*

Be it known that I, GEORGE W. BLAKSLEY, of Rockford, in the county of Winnebago, and State of Illinois, have invented a new and improved Adjustable Breast-Collar; and I do hereby declare that the following is a full, clear, and exact description of the construction and operation of the same, reference being had to the accompanying drawings, making a part of this specification, in which my invention is represented by a perspective view.

The object of this invention is to provide, for public use, a breast-collar so constructed as to be easier for the horse, and to be adjustable in position.

In the drawing—

A represents the main part of the collar, and

B, the shoulder-strap, which supports it.

The part A extends around in front of the horse's breast, nearly in a horizontal position.

The part B passes vertically over the animal's shoulder, and, by means of buckles, $b\ b$, can be made to adjust the height of the part A, as may be desired.

The part A consists of the two padded straps, $A^1\ A^1$, attached along the outer side of each one of which is the stout strap $A^2$.

The forward ends of the two straps $A^2\ A^2$ are connected by the metallic tree C, their rear ends supporting the tug-buckles, $t\ t$.

The tree C, from the joint $c$, where it is connected to the straps $A^2$, extends forward to the end of the pad $A^1$, passing under a leather sheath, $c^1$, which, as the collar bends, will slip easily back and forth on the body of the tree, to accommodate itself to the flexure.

From the ends of the pads, the tree curves forward in the form of an arch, $c^2$, and, at its front end, is vertically slotted, in order that the martingale may be passed through it, or that the forward team may be connected to it.

The metallic tree C is of sufficient length to extend nearly across the horse's breast so as to bring the strain almost directly backward from its ends, instead of allowing the flexible breast-collar to compress the horse's shoulders together, as heretofore, and thereby seriously inconvenience and annoy him. At the same time, the curve $c^2$, between the pads, allows the collar to be raised, without choking the horse, and also renders it cooler and more comfortable for the animal in hot weather.

Having thus described my invention,

What I claim as new, and desire to secure by Letters Patent, is—

The metallic tree C, when constructed as described, jointed, at $c$, to the straps $A^2$, and working through the loops $C'$, upon the pads $A^1$, whereby the collar is adapted to conform to the motion of the horse's shoulders, as herein set forth and shown.

GEO. W. BLAKSLEY.

Witnesses:
　CHAS. A. PETTIT,
　F. C. BEACH.